United States Patent
Goto

[11] 3,912,378
[45] Oct. 14, 1975

[54] OIL IMMERSION APOCHROMATIC MICROSCOPE OBJECTIVE

[75] Inventor: Atsuo Goto, Hachioji, Japan

[73] Assignee: Olympus Optical Co., Ltd., Tokyo, Japan

[22] Filed: Feb. 4, 1974

[21] Appl. No.: 439,608

[30] Foreign Application Priority Data
Feb. 8, 1973 Japan.................................. 48-15127

[52] U.S. Cl............ 350/216; 350/175 ML; 350/177
[51] Int. Cl.²......................................... G02B 21/02
[58] Field of Search..................... 350/175 ML, 216

[56] References Cited
UNITED STATES PATENTS

| | | | |
|---|---|---|---|
| 2,363,770 | 11/1944 | Bennett............... | 350/175 ML UX |
| 3,530,436 | 9/1970 | Bertek et al. ......... | 350/175 ML UX |
| 3,572,902 | 3/1971 | Uetake.................. | 350/175 ML UX |

*Primary Examiner*—John K. Corbin
*Attorney, Agent, or Firm*—Waters, Schwartz & Nissen

[57] ABSTRACT

Oil immersion apochromatic microscope objective with a magnification of 100X and at a numerical aperture on the order of 1.35 and comprising, from front to back, ten lenses arranged in five components, a first component being a semisphere singlet, a second component being a positive meniscus lens with a forwardly concave front face, a third component being a doublet composed of a negative lens and a biconvex fluorspar lens and positively refracting, a fourth component being a triplet composed of two lenses and a biconvex fluorspar lens sandwiched between these two lenses, and a fifth component being a triplet composed of two lenses and a biconcave alum lens sandwiched between these two lenses and with a rearwardly concave rear face, with particular conditions defining the respective Abbe numbers of the components.

3 Claims, 9 Drawing Figures

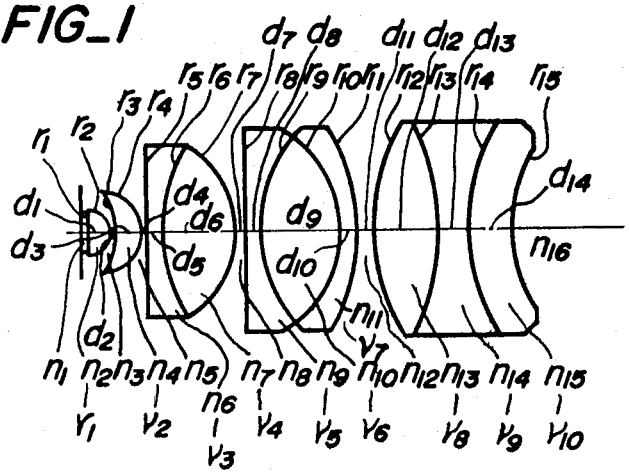
FIG_1
FIG_2A 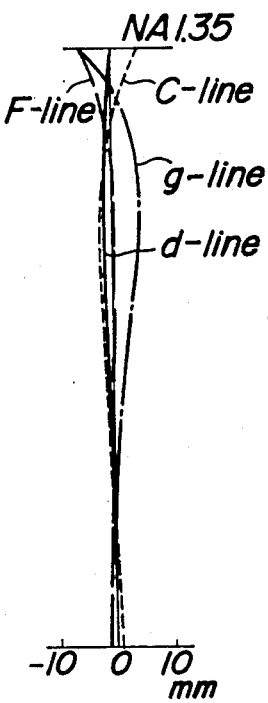
FIG_2B 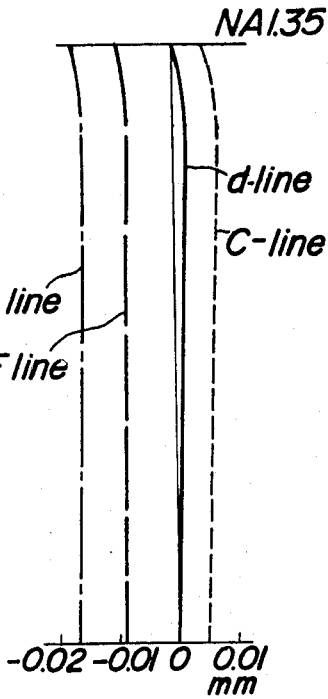
FIG_2C 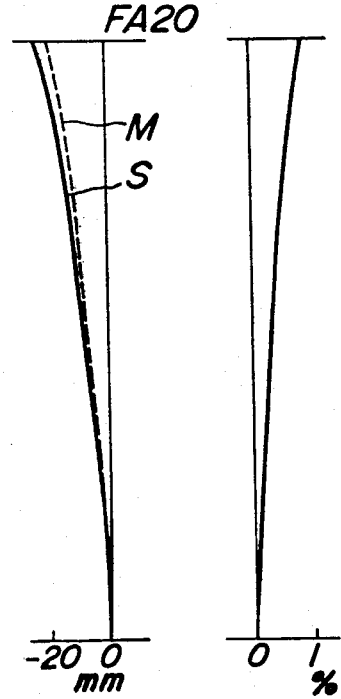 FIG_2D 

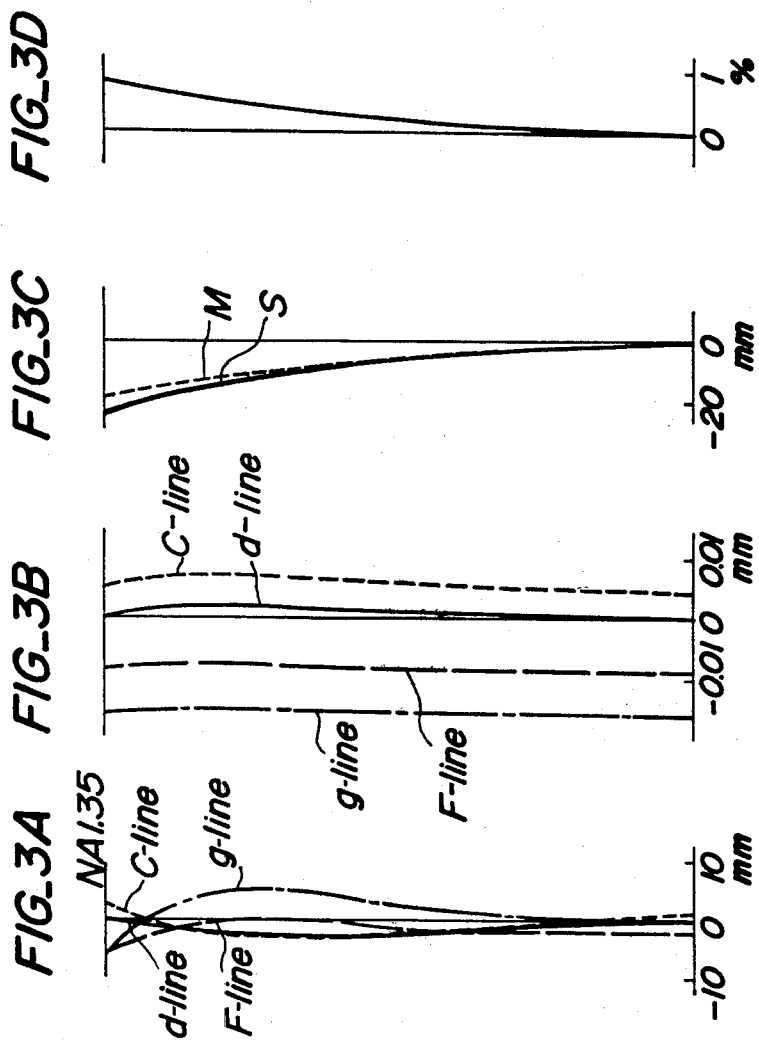

OIL IMMERSION APOCHROMATIC MICROSCOPE OBJECTIVE

This invention relates to microscope objectives and more particularly to an oil immersion apochromatic microscope objective designed to operate with a magnification of 100X and at numerical apertures (NA) on the order of 1.35.

In general, in order to provide an apochromatic objective, glass and a lens material whose partial dispersion ratio is different from that of the glass must be used as lens materials. As such lens material, heretofore, it has been the common practice to use fluorspar crystal. The use of the fluorspar crystal, however, is insufficient to correct the colored fringes of an apochromatic objective designed to operate with a magnification of 100X and at a numerical aperture as high as 1.35, and as a result, alum crystal has been used.

The key in designing the apochromatic objective consists in the kind of glass that is combined with the fluorspar crystal and alum crystal.

An object of the invention is to provide an apochromatic objective made of fluorspar and alum crystals and designed to operate with substantial suppression of various aberrations.

A feature of the invention is the provision of an objective of the character set forth which comprises ten lenses arranged in five components, a first component being a semisphere singlet, a second being a positive meniscus lens with a forwardly concave front face, a third component being a doublet composed of a negative lens and a biconvex fluorspar lens and positively refracting, a fourth component being a triplet composed of two lenses and a biconvex fluorspar lens sandwiched between the two lenses, and a fifth component being a triplet composed of two lenses and a biconcave alum lens sandwiched between the two lenses and with a rearwardly concave rear face, and the Abbe numbers $\nu_1; \nu_2 \ldots \nu_{10}$ numbered from the front toward the rear of the objective being defined by the following four conditions:

1. $\nu_2 > 80$
2. $55 > \nu_3 > 45$
3. $54 > \nu_8 > \nu_3$
4. $54 > \nu_8 > \nu_{10}$.

The invention will now be described in greater detail with reference to the accompanying drawings, wherein:

FIG. 1 is a cross sectional view showing the construction of the microscope objective according to the invention;

FIGS. 2A to 2D are graphical representations of the spherical aberration, sine condition OSC', astigmatism and distortion, respectively, and related to Example 1 of FIG. 1; and FIGS. 3A to 3D are graphical representations of the spherical aberrations, sine condition OSC', astigmatism and distortion, respectively, and related to Example 2 of FIG. 1.

In designing apochromatic objectives, it is desirable to remove chromatic aberration on axis and to make chromatic aberration on magnification as small as possible.

The condition (1) $\nu_2 > 80$ insures an excellent correction of chromatic aberrations on magnification and suppresses the secondary spectrum at the front components. If $\nu_2$ is smaller than 80, the color on magnification becomes large. Such large color on magnification could not be corrected by the correcting power of the color on magnification of a conventional eyepiece.

The condition (2) $55 > \nu_3 > 45$ limits the color correction in the third component doublet and suppresses the secondary spectrum with the aid of the condition (1). $\nu_3$ smaller than 45 favors the correction of the chromatic aberrations on magnification, but produces the secondary spectrum. This secondary spectrum could not be suppressed by the rear components. $\nu_3$ larger than 55 makes the correction of the chromatic aberrations on axis insufficient.

The condition (3) $54 > \nu_8 > \nu_3$ together with the foregoing conditions (1) and (2) insures an excellent correction of chromatic aberrations on near axis due to the partial dispersion of the alum lens of the fifth component. If the condition (3) is not satisfied, the chromatic aberrations on near axis become increased and hence do not provide an improved apochromatic objective suitable for microscope practice.

The condition (4) $54 > \nu_3 > \nu_{10}$ with the aid of the condition (3) reduces the curvature of color in the spherical aberrations, thereby correcting the irregularity of such curvature of color and hence providing an improved apochromatic objective. If the condition (4) is not satisfied, the correction of color at that portion of images which has a large numerical aperture becomes worse, thus rendering impossible to provide an apochromat which is free from chromatic and spherical aberration.

The use of the fifth component in the form of a meniscus-shaped triplet insures a large free working distance on the order of 0.106 mm irrespective of the large numerical aperture of 1.35 and a small Petzval sum on the order of 1.07 contrary to a Petzval sum on the order of 1.3 established by the conventional objective of the character set forth, thereby improving curvature of field.

The invention will now be described with reference to practical examples.

EXAMPLE 1

The lens construction of the present embodiment is shown in FIG. 1.

In FIG. 2A is graphically represented the spherical aberration for image rays in the C, d, F and g lines of the spectrum as related to the objective shown in FIG. 1. In FIG. 2B is graphically represented the sine condition for image rays in the C, d, F and g lines of the spectrum as related to the objective shown in FIG. 1. In FIG. 2C is graphically represented the sagittal and meridional astigmatism designated by S and M, respectively, and related to the objective shown in FIG. 1. In FIG. 2D is graphically represented the distortion as related to the objective shown in FIG. 1.

Numerical values of radii of curvature $r_1$ to $r_{15}$ and thicknesses and separations $d_1$ to $d_{14}$, based upon a numerical value of 1.753 for the overall focal length, along with the refractive indices $n_1$ to $n_{16}$ and the Abbe numbers $\nu_1$ to $\nu_{10}$ of the present embodiment are given in the following table:

Working Distance WD = 0.106
(Thickness of cover glass t = 0.17)

| | | | | |
|---|---|---|---|---|
| $r_1=$ | ∞ | | $n_1=1.51502$ | |
| | | $d_1=0.82$ | $n_2=1.52542$ | $\nu_1=64.55$ |
| $r_2=$ | −0.785 | | | |

-Continued

Working Distance WD = 0.106
(Thickness of cover glass t = 0.17)

| | | $d_2=0.025$ | $n_3=1$ | |
|---|---|---|---|---|
| $r_3=$ | −2.249 | $d_3=0.98$ | $n_4=1.43389$ | $\nu_2=95.2$ |
| $r_4=$ | −1.415 | $d_4=0.13$ | $n_5=1$ | |
| $r_5=$ | −180.954 | $d_5=0.51$ | $n_6=1.58904$ | $\nu_3=53.33$ |
| $r_6=$ | 4.750 | $d_6=2.57$ | $n_7=1.43389$ | $\nu_4=95.2$ |
| $r_7=$ | −3.2 | $d_7=0.32$ | $n_8=1$ | |
| $r_8=$ | 59.153 | $d_8=0.5$ | $n_9=1.61340$ | $\nu_5=43.84$ |
| $r_9=$ | 4.68 | $d_9=2.75$ | $n_{10}=1.43389$ | $\nu_6=95.2$ |
| $r_{10}=$ | −3.518 | $d_{10}=0.5$ | $n_{11}=1.61340$ | $\nu_7=45.84$ |
| $r_{11}=$ | −6.645 | $d_{11}=0.62$ | $n_{12}=1$ | |
| $r_{12}=$ | 6.435 | $d_{12}=2.29$ | $n_{13}=1.57957$ | $\nu_8=53.75$ |
| $r_{13}=$ | −7.852 | $d_{13}=0.98$ | $n_{14}=1.45609$ | $\nu_9=58.4$ |
| $r_{14}=$ | 7.328 | $d_{14}=1.47$ | $n_{15}=1.56444$ | $\nu_{10}=43.78$ |
| $r_{15}=$ | 4.239 | | $n_{16}=1$ | |

$\beta=-100X$
$f=1.753$
$NA=1.35$

EXAMPLE 2

The lens construction of the present embodiment is the same as that of Example 1 and shown in FIG. 1.

In FIG. 3A is graphically represented the spherical aberration for image rays in the C, d, F and g lines of the spectrum as related to the objective shown in FIG. 1. In FIG. 3B is graphically represented the sine condition for image rays in the C, d, F and g lines of the spectrum as related to the objective shown in FIG. 1. In FIG. 3C is graphically represented the sagittal and meridional astigmatism designated by S and M, respectively, and related to the objective shown in FIG. 1. In FIG. 3D is graphically represented the distortion as related to the objective shown in FIG. 1.

Numerical values of radii of curvature $r_1$ to $r_{15}$ and thicknesses and separations $d_1$ to $d_{14}$, based upon a numerical value of 1.752 for the overall focal length, along with the refractive indices $n_1$ to $n_{16}$ and the Abbe numbers $\nu_1$ to $\nu_{10}$ of the present embodiment are given in the following table:

Working Distance WD = 0.100
(Thickness of cover glass t = 0.17)

| | | | $n_1=1.51502$ | |
|---|---|---|---|---|
| $r_1=$ | ∞ | $d_1=0.83$ | $n_2=1.52542$ | $\nu_1=64.55$ |
| $r_2=$ | −0.784 | $d_2=0.02$ | $n_3=1$ | |
| $r_3=$ | −2.498 | $d_3=1.01$ | $n_4=1.48656$ | $\nu_2=84.47$ |
| $r_4=$ | −1.503 | $d_4=0.13$ | $n_5=1$ | |
| $r_5=$ | −150.10 | $d_5=0.51$ | $n_6=1.58900$ | $\nu_3=48.61$ |
| $r_6=$ | 4.695 | $d_6=2.57$ | $n_7=1.43389$ | $\nu_4=95.2$ |
| $r_7=$ | −3.176 | $d_7=0.32$ | $n_8=1$ | |
| $r_8=$ | −680.93 | $d_8=0.50$ | $n_9=1.61340$ | $\nu_5=43.84$ |
| $r_9=$ | 4.535 | $d_9=2.75$ | $n_{10}=1.43387$ | $\nu_6=95.2$ |
| $r_{10}=$ | −3.512 | $d_{10}=0.50$ | $n_{11}=1.61340$ | $\nu_7=43.84$ |
| $r_{11}=$ | −6.267 | | | |

-Continued

Working Distance WD = 0.100
(Thickness of cover glass t = 0.17)

| | | $d_{11}=0.60$ | $n_{12}=1$ | |
|---|---|---|---|---|
| $r_{12}=$ | 6.375 | $d_{12}=2.30$ | $n_{13}=1.58875$ | $\nu_8=51.18$ |
| $r_{13}=$ | −8.424 | $d_{13}=0.98$ | $n_{14}=1.45609$ | $\nu_9=58.4$ |
| $r_{14}=$ | 7.881 | $d_{14}=1.47$ | $n_{15}=1.57501$ | $\nu_{10}=41.49$ |
| $r_{15}=$ | 4.236 | | $n_{16}=1$ | |

$\beta=-100X$
$f=1.752$
$NA=1.35$

What is claimed is:

1. An oil immersion apochromatic microscope objective designed to operate with a magnification of 100X and at a numerical aperture on the order of 1.35 and comprising, from front to back, ten lenses arranged in five components, a first component being a semisphere singlet, a second component being a positive meniscus lens with a forwardly concave front face, a third component being a doublet composed of a negative lens and a biconvex fluorspar lens and positively refracting, a fourth component being a triplet composed of two lenses and a biconvex fluorspar lens sandwiched between said two lenses, and a fifth component being a triplet composed of two lenses and a biconcave alum lens sandwiched between said two lenses with a rearwardly concave rear face, the Abbe numbers $\nu_1$, $\nu_2$ . . . $\nu_{10}$ counted from the front toward the rear of the objective being defined by the following four conditions;
  1. $\nu_2 > 80$
  2. $55 > \nu_3 > 45$
  3. $54 > \nu_8 > \nu_3$
  4. $54 > \nu_8 > \nu_{10}$.

2. The microscope objective as claimed in claim 1, constructed according to the following constructional data:

Working Distance WD = 0.106
(Thickness of cover glass t = 0.17)

| | | | $n_1=1.51502$ | |
|---|---|---|---|---|
| $r_1=$ | ∞ | $d_1=0.82$ | $n_2=1.52542$ | $\nu_1=64.55$ |
| $r_2=$ | −0.785 | $d_2=0.025$ | $n_3=1$ | |
| $r_3=$ | −2.249 | $d_3=0.98$ | $n_4=1.43389$ | $\nu_2=95.2$ |
| $r_4=$ | −1.415 | $d_4=0.13$ | $n_5=1$ | |
| $r_5=$ | −180.954 | $d_5=0.51$ | $n_6=1.58904$ | $\nu_3=53.33$ |
| $r_6=$ | 4.750 | $d_6=2.57$ | $n_7=1.43389$ | $\nu_4=95.2$ |
| $r_7=$ | −3.2 | $d_7=0.32$ | $n_8=1$ | |
| $r_8=$ | 59.153 | $d_8=0.5$ | $n_9=1.61340$ | $\nu_5=43.84$ |
| $r_9=$ | 4.68 | $d_9=2.75$ | $n_{10}=1.43389$ | $\nu_6=95.2$ |
| $r_{10}=$ | −3.518 | $d_{10}=0.5$ | $n_{11}=1.61340$ | $\nu_7=45.84$ |
| $r_{11}=$ | −6.645 | $d_{11}=0.62$ | $n_{12}=1$ | |
| $r_{12}=$ | 6.435 | $d_{12}=2.29$ | $n_{13}=1.57957$ | $\nu_8=53.75$ |
| $r_{13}=$ | −7.852 | $d_{13}=0.98$ | $n_{14}=1.45609$ | $\nu_9=58.4$ |
| $r_{14}=$ | 7.328 | $d_{14}=1.47$ | $n_{15}=1.56444$ | $\nu_{10}=43.78$ |
| $r_{15}=$ | 4.239 | | $n_{16}=1$ | |

$\beta=-100X$
$f=1.753$
$NA=1.35$ wherein $r_1$ to $r_{15}$ inclusive designate the lens curvatures, $d_1$ to $d_{14}$ inclusive designate the lens thicknesses and spaces between the lenses, $n_1$ to $n_{16}$ inclusive designate the refractive indices of the respective lenses, and $\nu_1$ to $\nu_{10}$ designate the Abbe numbers of said lenses counting from the front to the rear of the objective.

3. The microscope objective as claimed in claim 1, constructed according to the following constructional data by:

Working Distance WD = 0.100
(Thickness of cover glass t = 0.17)

| | | | | | |
|---|---|---|---|---|---|
| $r_1=$ | $\infty$ | | | $n_1=1.51502$ | |
| | | $d_1=0.83$ | | $n_2=1.52542$ | $\nu_1=64.55$ |
| $r_2=$ | $-0.784$ | | | | |
| | | $d_2=0.02$ | | $n_3=1$ | |
| $r_3=$ | $-2.498$ | | | | |
| | | $d_3=1.01$ | | $n_4=1.48656$ | $\nu_2=84.47$ |
| $r_4=$ | $-1.503$ | | | | |
| | | $d_4=0.13$ | | $n_5=1$ | |
| $r_5=$ | $-150.10$ | | | | |
| | | $d_5=0.51$ | | $n_6=1.58900$ | $\nu_3=48.61$ |
| $r_6=$ | $4.695$ | | | | |
| | | $d_6=2.57$ | | $n_7=1.43389$ | $\nu_4=95.2$ |
| $r_7=$ | $-3.176$ | | | | |
| $r_8=$ | $-680.93$ | $d_7=0.32$ | | $n_8=1$ | |
| | | $d_8=0.50$ | | $n_9=1.61340$ | $\nu_5=43.84$ |
| $r_9=$ | $4.535$ | | | | |
| | | $d_9=2.75$ | | $n_{10}=1.43387$ | $\nu_6=95.2$ |
| $r_{10}=$ | $-3.512$ | | | | |
| | | $d_{10}=0.50$ | | $n_{11}=1.61340$ | $\nu_7=43.84$ |
| $r_{11}=$ | $-6.267$ | | | | |
| | | $d_{11}=0.60$ | | $n_{12}=1$ | |
| $r_{12}=$ | $6.375$ | | | | |
| | | $d_{12}=2.30$ | | $n_{13}=1.58875$ | $\nu_8=51.18$ |
| $r_{13}=$ | $-8.424$ | | | | |
| | | $d_{13}=0.98$ | | $n_{14}=1.45609$ | $\nu_9=58.4$ |
| $r_{14}=$ | $7.881$ | | | | |
| | | $d_{14}=1.47$ | | $n_{15}=1.57501$ | $\nu_{10}=41.49$ |
| $r_{15}=$ | $4.236$ | | | | |
| | | | | $n_{16}=1$ | |

$\beta = -100\text{X}$
$f = 1.752$
$NA = 1.35$ wherein $r_1$ to $r_{15}$ inclusive designate the lens curvatures, $d_1$ to $d_{14}$ inclusive designate the lens thicknesses and spaces between the lenses, $n_1$ to $n_{16}$ inclusive designate the refractive indices of the respective lenses, and $\nu_1$ to $\nu_{10}$ designate the Abbe numbers of said lenses counting from the front to the rear of the objective.

* * * * *